United States Patent [19]

Onishi

[11] Patent Number: 5,010,731
[45] Date of Patent: Apr. 30, 1991

[54] EXHAUSTING APPARATUS OF FOUR-CYCLE FOUR-CYLINDER ENGINE

[75] Inventor: Kazuhiko Onishi, Toyohashi, Japan

[73] Assignee: Suzuki Jidosha Kogyo Kabushiki Kaisha, Kamimura, Japan

[21] Appl. No.: 484,958

[22] Filed: Feb. 26, 1990

[30] Foreign Application Priority Data

Mar. 1, 1989 [JP] Japan .................................. 1-46676

[51] Int. Cl.[5] .............................................. F02B 27/02
[52] U.S. Cl. ........................................ 60/313; 60/323
[58] Field of Search .................................. 60/313, 323

[56] References Cited

FOREIGN PATENT DOCUMENTS

| 32417 | 3/1977 | Japan | 60/313 |
|---|---|---|---|
| 132018 | 7/1985 | Japan | 60/313 |
| 45924 | 2/1987 | Japan | 60/313 |

Primary Examiner—Douglas Hart
Attorney, Agent, or Firm—Schwartz & Weinrieb

[57] ABSTRACT

An exhausting apparatus for a four-cycle four-cylinder engine having four cylinders each provided with an exhaust port comprises four exhaust pipes connected to corresponding exhaust ports of the engine cylinders. The four exhaust pipes are classified into first and second groups in accordance with ignition timings and the first and second groups of two exhaust pipes each are shifted in connection with the ignition timings by means of an angle of 360° with respect to each other. Exhaust chamber members including two exhaust chambers each, are in communication with front portions of the exhaust pipes respectively through means of communication holes and two communication pipes, one connecting the first group of the exhaust pipes and the other connecting the second group of the exhaust pipes. The downstream ends of the exhaust pipes are connected to a collecting cylinder having its interior separated by means of a separator into two sections into which the first and second groups of the exhaust pipes are arranged, respectively. A collecting exhaust pipe is connected to a downstream end of the collecting cylinder member and a muffler is mounted upon the collecting exhaust pipe.

9 Claims, 3 Drawing Sheets

EXHAUSTING APPARATUS OF FOUR-CYCLE FOUR-CYLINDER ENGINE

FIELD OF THE INVENTION

This invention relates to an improved exhausting apparatus of a four-cycle four-cylinder engine, and particularly to such an engine of a motorcycle.

BACKGROUND OF THE INVENTION

In general, a four-cycle four-cylinder engine may be mounted upon a large sized motorcycle and, in such case, it will be particularly required for the engine to be of the high-speed rotation and high output type in view of the maneuverability of the motorcycle. Exhaust gas discharged from the engine is introduced, through means of a plurality of exhaust pipes, four in the present case, into an exhaust mufflers serving to silence the exhaust noise and the exhaust gas is then exhausted. However, since the longitudinal length of the body of the motorcycle is itself limited to a predetermined range, the lengths of the exhaust pipes and the muffler to be assembled upon the motorcycle body are themselves limited in connection with the length of the motorcycle body. This involves a problem such that the sizes and the lengths of the exhaust pipes and the muffler cannot be designed only upon the bases of the performances thereof because of the inevitable limits of the size and the length of the motorcycle body. Therefore, with an engine of the high-speed rotation and high output tYpe, there is a case where the engine has which a rotation period in which the output is partially adversely dropped or reduced and, hence, the motorcycle is operated with less maneuverability.

In order to obviate such defect, in accordance with conventional technology, exhaust chambers are provided for two of the four exhaust pipes, the other two exhaust pipes being connected through means of a communication pipe, or alternatively, a 180° ignition type separator, described later, is disposed so as to reduce the decrease of the output. When the 180° ignition type separator is utilized, it is required to use exhaust pipes each having a relatively short length and, hence, the pulsation of the exhaust gas cannot be effectively utilized. In addition, a collecting cylinder must be positioned upon the front side, resulting in the limitation of the mounting characteristics of the motorcycle body.

OBJECT OF THE INVENTION

An object of this invention is to substantially eliminate the defects or disadvantages of the prior art described above and to provide an exhausting apparatus for a four-cycle four-cylinder engine which is capable of possibly eliminating the reduced output of the engine and being which is convenient for mounting upon a body of a motorcycle.

SUMMARY OF THE INVENTION

This and other objects can be achieved according to this invention by providing an exhausting apparatus for a four-cycle four-cylinder engine having four cylinders each of which is provided with an exhaust port, comprising four exhaust pipes connected to corresponding exhaust ports of the engine cylinders, the four exhaust pipes being separated into first and second groups each including two exhaust pipes in accordance with ignition timings, the first and second groups of exhaust pipes being shifted in connection with ignition timings by means of 360°, exhaust chamber members including exhaust chambers communicating with front portions of the exhaust pipes respectively through means of communication holes, two communication pipes, one connecting the first group of the exhaust pipes and the other connecting the second group of the exhaust pipes, a collecting cylinder member to which downstream ends of the exhaust pipes are connected, a separator separating the interior of the collecting cylinder member into two sections within which the first and second, groups of the exhaust pipes are arranged, respectively, a collecting exhaust pipe connected to a downstream end of the collecting cylinder member, and a muffler mounted upon the collecting exhaust pipe.

According to the structure of the exhausting apparatus described above, the exhaust chambers each having an inner volume larger than the exhaust volume of each exhaust pipe are communicated with the exhaust pipes, respectively, so as to act as an interferance chamber so as to substantially eliminate the output reduction of the engine. Four exhaust pipes are connected to the corresponding exhaust ports of the engine cylinders and the four exhaust pipes are separated into first and second groups in accordance with the ignition timings, the first and second groups of exhaust pipes being shifted in connection with the ignition timings by means of 360° so as to reduce the back pressure. The location of the separator of 360° ignition type in association with the exhaust pipes mentioned above makes the lengths thereof suitable. Thus, the output reduction can be possibly reduced and the maneuverability can be improved while maintaining the high speed rotation and high output.

BRIEF DESCRIPTION OF THE DRAWINGS

Various other objects, features, and attendant advantages of the present invention will become more fully apparent from the following detailed description, when considered in connection with the accompanying drawings, in which like reference characters designate like or corresponding parts throughout the several views, and wherein.

DESCRIPTION OF THE PREFERRED EMBODIMENT

In advance, of the description of a preferred embodiment of the apparatus according to this invention, one example of a conventional exhausting device of a four-cycle four-cylinder engine will be described with reference to FIGS. 7 and 8 for a better understanding of this invention.

Figure 7:
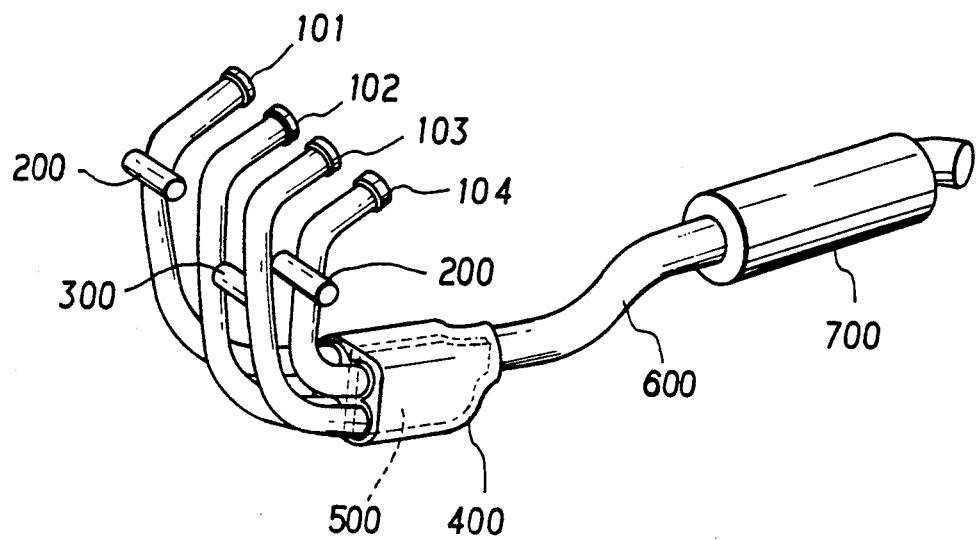
FIG. 7 is a perspective view of a conventional exhausting apparatus of a four-cycle four-cYlinder engine.

Referring to FIG. 7, an exhausting device of a four-cycle four-cylinder engine comprises four exhaust pipes 101, 102, 103 and 104, exhaust chambers 200 provided for the exhaust pipes 101 and 104, a connecting pipe 300, a collecting cylinder 400 to which one end of each of the respective exhaust pipes is connected a 180° ignition type separator 500 disposed within the collecting cylinder 400 and adapted to separate the exhaust pipes 101 and 102 from the exhaust pipes 103 and 104, a collecting exhaust pipe 600 connected to the cylinder 400, and a muffler 700 mounted upon the collecting exhaust pipe 600. In this conventional example, the separator 500 is disposed vertically in the illustrated state and separates the exhaust pipes 101 to 104 into one group of pipes comprising the exhaust pipes 101 and 102 and another group of pipes comprising the exhaust pipes 103 and 104 such as is shown in FIG. 8.

Figure 8:
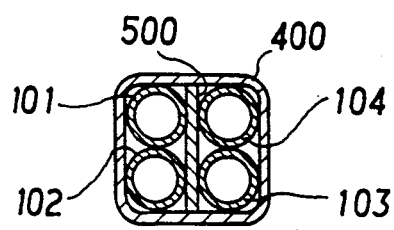
FIG. 8 is a view similar to that shown in FIG. 6, but of the conventional apparatus.

In connection with the brief illustration of FIG. 8, the separator 500 divides the interior of the collecting cylinder 400 into two sections within one of which the exhaust pipes 101 and 102 are communicated and within the other of which the exhaust pipes 103 and 104 are communicated. Accordingly, when the ignitions are performed sequentially in the order of the exhaust pipes 101, 102, 104 and 103, the ignition angle will be 180° and, hence, the separator of this type may be called a 180° ignition type separator 500. According to the arrangement of the 180° ignition type separator 500, a problem or disadvantages described hereinbefore will be caused.

This invention was conceived so as to substantially eliminate the disadvantages of the prior art described above, and will be described hereunder with reference to FIGS. 1 to 6.

Figure 1:
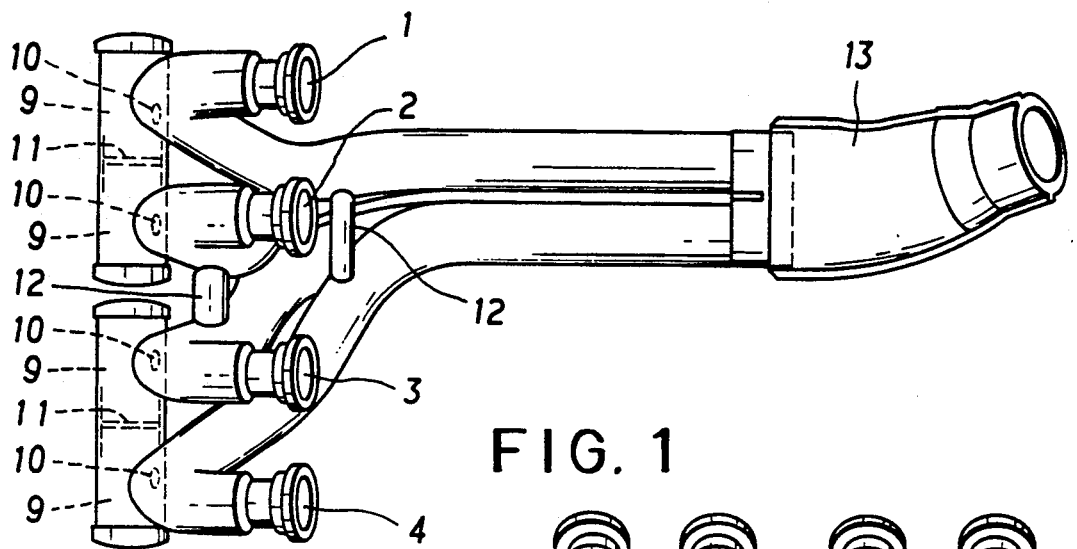
FIG. 1 is a plan view of an arrangement of exhaust pipes of an exhausting apparatus of a four-cycle four-cylinder engine constructed according to this invention.
Figure 2:
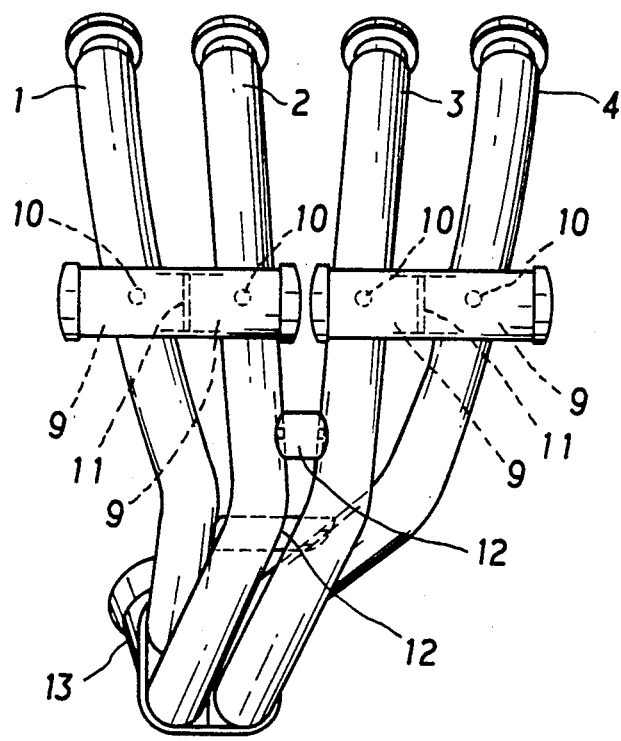
FIG. 2 is a reverse plan view of the arrangement of the exhaust pipes shown in FIG. 1.
Figure 3:
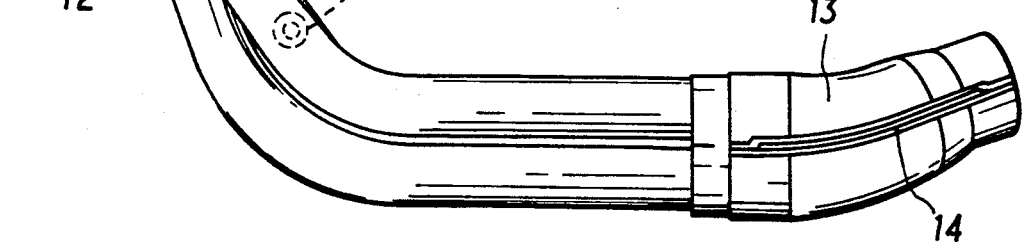
FIG. 3 is a side view of the arrangemnt of the exhaust pipes shown in FIG. 1 or 2.
Figure 4:
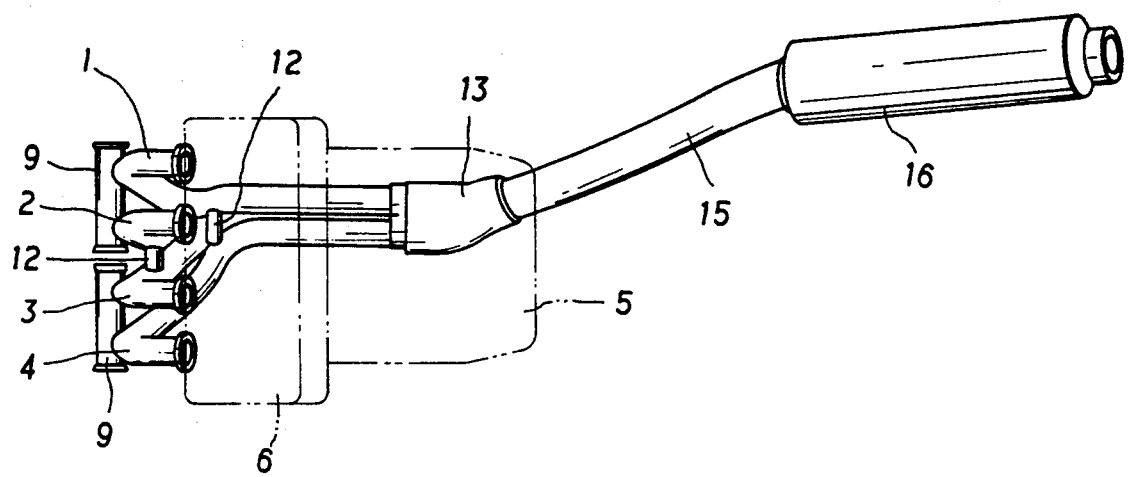
FIG. 4 is a plan view of the entire exhausting apparatus according to this invention.
Figure 5:
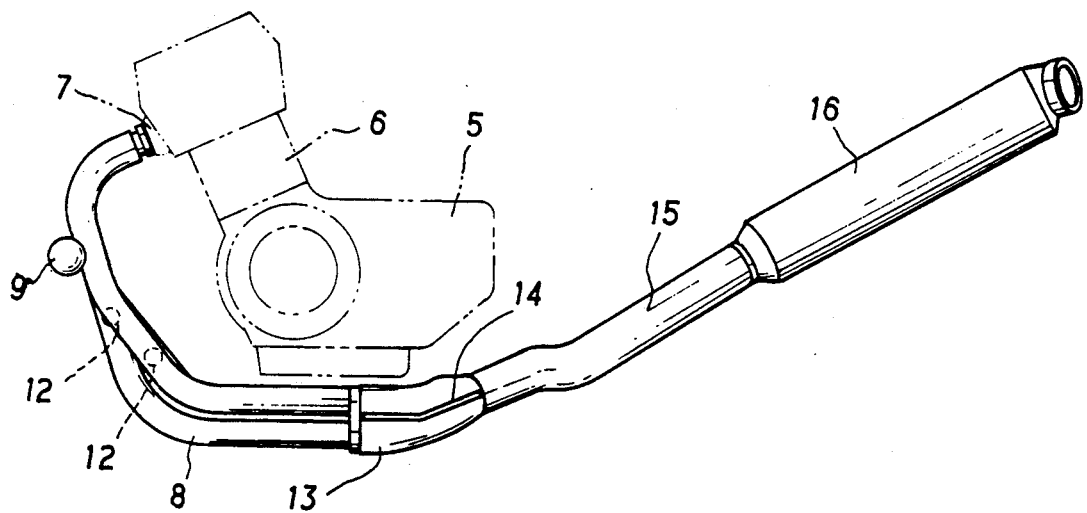
FIG. 5 is a side view of the exhausting apparatus shown in FIG. 4.
Figure 6:
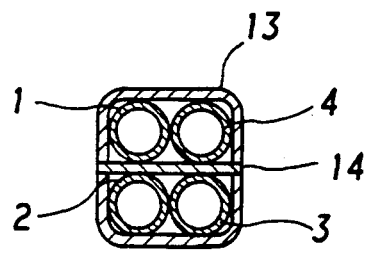
FIG. 6 is a sectional view of the front portion of an exhaust pipe collecting cYlinder of the apparatus shown in FIG. 5.

First, referring to FIG. 5, there is shown a four-cycle four-cylinder engine 5 of a motorcycle in which four cylinders 6 are arranged horizontally in series. Each of the cylinders 6 of the engine 5 is provided with an exhaust port, to which an exhaust pipe 8 is connected. The exhaust pipe 8 in FIG. 5 totally designates the exhaust pipes 1, 2, 3 and 4 in the illustration of the other figures such as in FIG. 1. A front portion of the exhaust pipe 8 communicates with an exhaust chamber means, and actually, one exhaust chamber means including two chambers 9 communicates with the exhaust pipes 1 and 2 and the other exhaust chamber means including two chambers 9 communicates with the exhaust pipes 3 and 4 as shown in FIG. 1, for example. It is necessary for each of the exhaust chambers 9 to have an inner volume at least larger than the exhaust volume of each of the exhaust pipes. In case the inner volume of the exhaust chamber is smaller than the exhaust volume of the exhaust pipe, the exhaust chamber will exhibit an interference function. The communication of the exhaust chamber means 9 with the exhaust pipe 8 is established through means of a communication hole 10 having a diameter of approximately 10 to 12 mm. In the illustration, two exhaust chamber means are shown, but each of them is divided by a partition means 11 into two exhaust chambers 9 and 9 which communicate with the exhaust pipes, respectively, and hence the respective exhaust chambers correspondingly communicate with the exhaust pipes 1, 2, 3 and 4. The exhaust pipes 1 and 4 and the exhaust pipes 2 and 3 are in communication with each other by means of communication pipes 12 and 12, respectively, behind the exhaust chamber means. Communication holes, not numbered, each having a diameter of approximately 10 to 12 mm is formed within the exhaust pipes so as to communicate them with the communication pipes 12 in accordance with a preferred embodiment so as to achieve the effect of a reduction of the resistance. The rear, that is, downstream, ends of the respective exhaust pipes 1, 2, 3 and 4 are connected to a collecting cylinder 13 so that the exhaust pipes 1 and 4 are arranged within the upper portion of the collecting cylinder 13 and the exhaust pipes 2 and 3 are arranged within the lower portion of the collecting cylinder 13. These two groups of the exhaust pipes are divided respectively into two sections by means of a separator 14 arranged horizontally as shown in FIG. 6. As illustrated in FIG. 6, the exhaust pipes 1 and 4 are arranged within the upper section of the collecting cylinder 13 and the exhaust pipes 2 and 3 are arranged within the lower section. According to this arrangement, when the ignitions are performed sequentially in the order of the exhaust pipes 1, 2, 4 and 3, which are separated respectively in connection with the exhaust timings, the ignition angle will be 360° and the separator 14 of this type is called a 360° ignition type separator. According to the arrangement of the 360° ignition type separator 14, the length of the exhaust pipes can preferably be made long.

The rear end of the collecting cylinder 13 is connected to a collecting pipe 15 with which a muffler 16 is coupled so as to silence the exhaust noise.

As described hereinbefore, according to this invention, the exhaust gas from the engine is intercepted by means of the exhaust chambers in communication with the front portions of the respective exhaust pipes so as to thereby eliminate the generation of the reduction of the output. The communication pipes and the sections of the separator are in communication with each other in a dual mode so as to separate them in accordance with the exhaust timings in order to reduce the back pressure. The arrangement of the 360° ignition type separator makes it possible to use exhaust pipes each having a relatively long length without adversely changing the mounting position of the collecting cylinder.

Obviously, many modifications and variations of the present invention are possible in light of the above teachings. It is therefore to be understood that within the scope of the appended claims, the present invention may be practiced otherwise than as specifically described herein.

What is claimed is:

1. An exhausting apparatus of a four-cycle, four-cylinder engine having four cylinders each of which is provided with an exhaust port, comprising:

four exhaust pipes connected to corresponding ones of said exhaust ports of said engine cylinders, said four exhaust pipes being separated into first and second groups, each group including two exhaust pipes, in accordance with ignition timings, said first and second groups of said exhaust pipes being shifted by means of an angle of 360°;

exhaust chamber means including exhaust chambers in communication with front portions of said exhaust pipes respectively through means of communication holes;

two communication pipes, one connecting said first group of said exhaust pipes, and the other one connecting said second group of said exhaust pipes;

a collecting cylinder means to which downstream ends of said exhaust pipes are connected;

a separator means separating an interior portion of said collecting cylinder means into two sections within which said first and second groups of said exhaust pipes are disposed, respectively;

a collecting exhaust pipe connected to a downstream end of said collecting cylinder means; and a muffler means mounted upon said collecting exhaust pipe.

2. An exhausting apparatus according to claim 1, wherein:

one of said exhaust chamber means includes two exhaust chambers each one of which is in communication with one of said exhaust pipes.

3. An exhausting apparatus according to claim 1, wherein:

said separator means is a partition plate horizontally dividing said interior portion of said collecting cylinder means.

4. An exhausting apparatus according to claim 1, wherein:

each of said exhaust chambers has an inner volume larger than an exhaust volume of each of said exhaust pipes.

5. Exhausting apparatus as set forth in claim 3, wherein:

said four exhaust pipes comprise first, second, third, and fourth exhaust pipes connected to first, second, third, and fourth engine cylinders the ignitions of which are performed sequentially in the order of said first, second, fourth, and third engine cylinders.

6. Exhausting apparatus as set forth in claim 5, wherein:

said first and fourth exhaust pipes are disposed upon one side of said partition plate; and said second and third exhaust pipes are disposed upon another side of said partition plate.

7. Exhausting apparatus as set forth in claim 6, wherein:

said first and fourth exhaust pipes are disposed upon an upper side of said partition plate; and said second and third exhaust pipes are disposed upon a lower side of said partition plate.

8. Exhausting apparatus as set forth in claim 5, wherein:

said first and fourth exhaust pipes comprise one of said first and second groups of said exhaust pipes, and said second and third exhaust pipes comprise another one of said first and second groups of said exhaust pipes.

9. Exhausting apparatus as set forth in claim 1, wherein:

said communication holes of said exhaust chamber means and said exhaust pipes have a diametrical extent within the range of 10–12 mm.

* * * * *